UNITED STATES PATENT OFFICE.

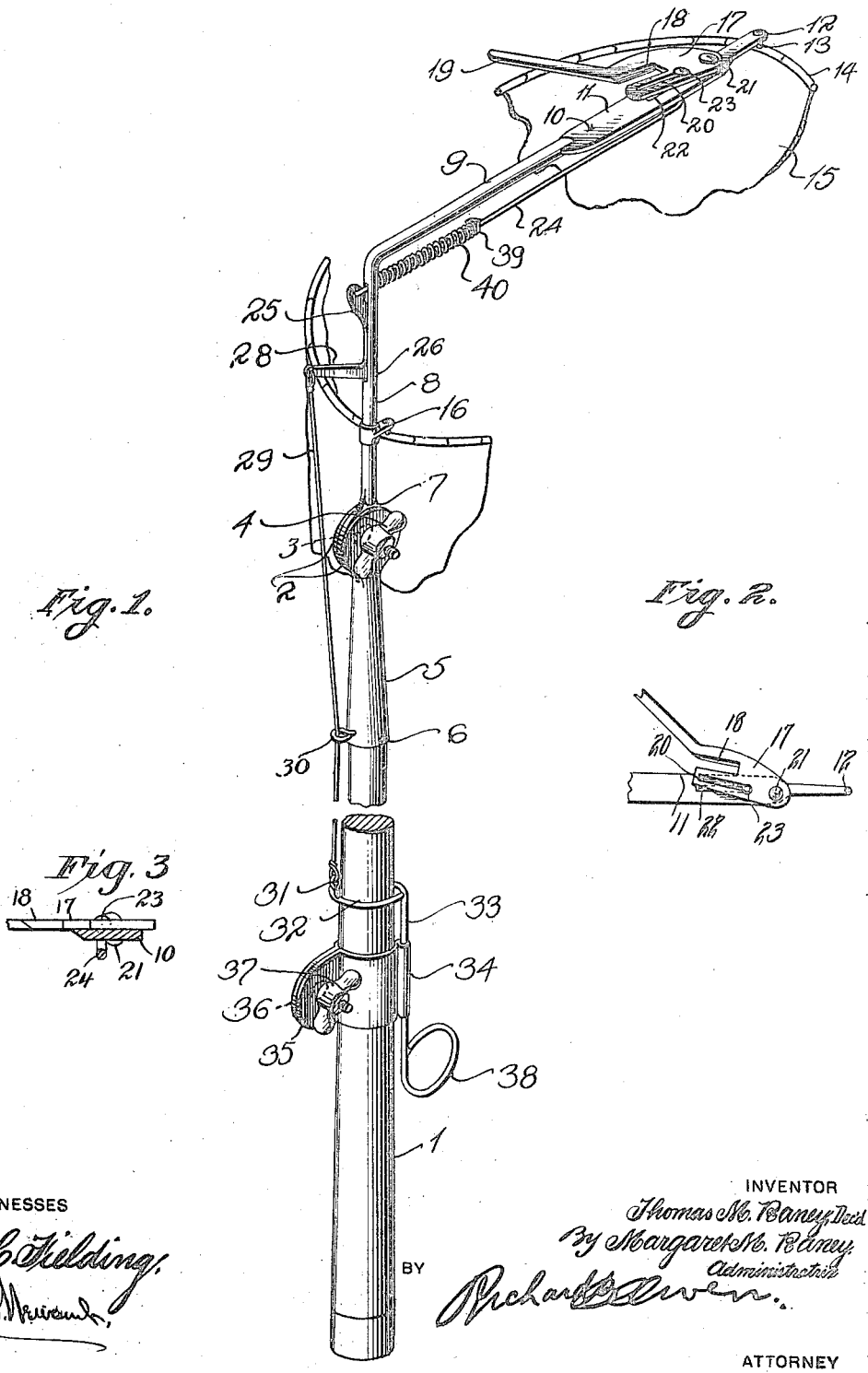

THOMAS M. RANEY, DECEASED, LATE OF LEADVILLE, COLORADO, BY MARGARET M. RANEY, ADMINISTRATRIX, OF COLORADO SPRINGS, COLORADO.

FRUIT PICKER AND GATHERER.

1,247,878.    Specification of Letters Patent.    Patented Nov. 27, 1917.

Application filed April 24, 1916. Serial No. 93,287.

*To all whom it may concern:*

Be it known that THOMAS M. RANEY, deceased, late a citizen of the United States, residing at Leadville, in the county of Lake and State of Colorado, invented new and useful Improvements in a Fruit Picker and Gatherer, of which the following is a specification.

This invention relates to a fruit picker and gatherer.

It is one object of the present invention to provide a device of the above mentioned character which is extremely simple in construction by reason of the fact that the co-operating blades are operated through the medium of angularly disposed slots having a pin working therein.

A further object resides in providing a novel arrangement of the operating means in connection with the handle of the device.

With the above and other objects in view, I will now proceed to describe a specific embodiment of the present invention which I have illustrated in the accompanying drawing wherein:

Figure 1 shows the device in perspective,

Fig. 2 is a detail plan view of the slots, and

Fig. 3 is a transverse sectional view taken through the fixed cutting blade of the picker.

The device comprises the usual handle 1 having at the top thereof the two members 2 spaced apart and through which a bolt 3 passes and is secured by a thumb nut 5. The members 2 are carried on a suitable end ferrule 4 fixed to the end of the handle 1 by rivets, screws, nails or the like 6. Disposed between the members 2 for clamping is a disk like member 7 of which a shank 8 forms a continuation and said shank is continued at substantially right angles to the portion 8 to form a horizontally extending arm 9 flattened at its outer end as shown at 10 and sharpened on the edge 11 to provide a blade.

The outer end of the shank as shown at 12 carries means 13 for securing the rim 14 of a collector 15 thereto and the vertical portion 8 also is provided with a similar means 16. Adjacent the outer end of the blade portion 10 is mounted a second blade 17 having the cutting edge 18 and the angularly extending gathering arm 19 which guides the fruit in toward the cutting edge 18. Opposite the cutting edge and angularly disposed is a slot 20 and the blade 17 is pivoted to the blade 10 as shown at 21. A slot 22 is formed in the blade 10 and, thus when the blades are in the normal open position with respect to each other, the two slots are disposed at an angle with their outer ends meeting. A pin 23 is disposed in these slots and sliding movement thereof will cause the blade member 17 to move relative to the blade member 10 and cut a fruit stem as it passes into the blade opening.

Movement of the pin 23 is produced by a rod 24 connected at one end therewith and at the other end with one arm 25 of a bell crank lever journaled at 26 in an opening 27 formed in the portion 8 of the arm. The other arm of the bell crank lever which is indicated at 28 is connected with a rod 29 which passes through an eye 30 and connects to a second eye 31 carried by a ring 32. This ring has formed thereon a shank 33 which is journaled for reciprocation in the member 34 having the clamp 35 secured around the handle by the bolt 36 and thumb screw nut 37. The shank 33 is provided with a finger ring 38 and thus as the finger ring 38 is engaged with the hand to move the shank 33, the blade member 17 will also be moved to coöperate with the blade 11 to cut fruit stems. In order to return the blade member 17 to its normal position after the cutting operation, the rod 24 carries a collar 39 with which a spring 40 engages, said spring being confined between the portion 8 and the collar and thereby exerting force to maintain the blade members 10 and 17 in open relation with respect to each other.

While, in the foregoing, I have described a specific embodiment of the present invention, it is nevertheless to be understood that, in practice, I may resort to such practical modifications as fall within the scope of my invention as defined in the appended claims.

I claim:

1. In a fruit picker, a fixed blade, a movable blade pivoted to said fixed blade, each of said blades being provided with longitudinally disposed slots, the pivot of said movable blade being offset from one of said slots, and a movable rod extending through said slots.

2. In a fruit picker, a fixed blade, a movable blade pivoted to said fixed blade, the said blades having longitudinaly disposed slots, the pivot point of said movable blade being offset from one of said slots, the cutting edges of said blades being in closed position when said slots are alined, and a rod extending through said slots and capable of moving longitudinally therein.

3. In a fruit picker, a fixed blade, a movable blade pivoted to said fixed blade and being normally disposed at an angle to the same, each blade having an elongated slot disposed parallel to the cutting edge of its respective blade, the said blades being arranged with their slotted portions superimposed, a movable rod having one end extended through said slots, and a spring for normally holding said rod at the limit of its movement in one direction.

4. In a fruit picker, a handle, an arm extending from said handle, a blade affixed to said arm, the said blade being provided with an elongated slot, a movable blade pivoted at one end to said fixed blade, the pivot for said movable blade being offset from the slot in said fixed blade, the said movable blade having an elongated slot adapted to move across the slot in said fixed blade, a longitudinally movable rod, one end of said rod being extended through said slots, a spring for normally holding said rod at the limit of its movement in one direction, and means on said handle for moving said rod against the tension of said spring.

In testimony whereof, I affix my signature in presence of two witnesses.

MARGARET M. RANEY,
*Administratrix of the estate of Thomas M. Raney, deceased.*

Witnesses:
R. D. WEIR,
ELLEN R. WEIR.